(12) United States Patent
Irving

(10) Patent No.: US 8,181,115 B2
(45) Date of Patent: May 15, 2012

(54) SYSTEM AND METHOD FOR PERFORMING VIDEO COLLABORATION

(75) Inventor: Dwight A Irving, Lebanon, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 831 days.

(21) Appl. No.: 12/028,930

(22) Filed: Feb. 11, 2008

(65) Prior Publication Data

US 2009/0204906 A1 Aug. 13, 2009

(51) Int. Cl.
*G06F 3/048* (2006.01)
*G06F 15/16* (2006.01)
*G06F 3/00* (2006.01)

(52) U.S. Cl. ............... 715/753; 715/758; 709/204
(58) Field of Classification Search ............ 715/753
See application file for complete search history.

(56) References Cited

U.S. PATENT DOCUMENTS

| | | | | |
|---|---|---|---|---|
| 6,564,380 | B1 * | 5/2003 | Murphy | 725/86 |
| 7,478,129 | B1 * | 1/2009 | Chemtob | 709/204 |
| 2003/0202088 | A1 * | 10/2003 | Knight | 348/14.08 |
| 2006/0087987 | A1 * | 4/2006 | Witt et al. | 370/260 |

OTHER PUBLICATIONS

Website, www.iminlikewithyou.com, "INTRO," printed on Feb. 11, 2008.
VSee, Brochure, available at www.vsee.com/brochure.pdf, printed on Feb. 11, 2008.
MindTools, Essential skills for an excellent career, printed on Feb. 11, 2008, available at http://www.mindtools.com/pages/Supplementary/BrainstormingWarmUps.htm.
Schade, Jenny, Eight Brainstorming Best Practices: How to Ensure Super-Colossal Ideas (Printer Friendly Version Copyright 2007), printed on Feb. 11, 2008, available at http://jrsconsulting.net/freearticles_26.html.
Video Conferencing: P2P Solution From VSee Launches New Free Full Collaboration Version, Mar. 5, 2007, available at http://www.masternewmedia.org/news/2007/03/05/video_conferencing_p2p_solution_from.htm.
Perry, John, IMS: The End-User and Service Provider's Best Friend, Feb. 2007, available at http://www.tmcnet.com/ims/0207/ims-feature-article-ims-%20the-end-user-and-service-providers.htm.
WebEx Screen Captures of View Demo Now in Progress, printed on Feb. 11, 2008, available at http://www.webex.com/dailydemo/index.php?m=true&biz=gen&TrackID=1008648&hbxref=&goid=demo_global.

* cited by examiner

*Primary Examiner* — Tuyetlien Tran
*Assistant Examiner* — Peiyong Weng
(74) *Attorney, Agent, or Firm* — Weingarten, Schurgin, Gagnebin & Lebovici LLP

(57) ABSTRACT

Provided are systems and methods of video collaboration. End-users may participate in collaboration sessions in which inter-personal barriers are rapidly dissolved through the completing of collaborative tasks. The end-users may be grouped into teams to perform these collaborative tasks, and may be scored and/or ranked based not only on performance of the task but on the interactions between team members. In some examples a coach or moderator is provided to assist with task completion and/or to facilitate social interaction between participants. According to various examples, system architectures are described for facilitating video collaboration. In one example, the architecture includes a multi-gateway architecture that segregates functions associated with presentation of an integrated video display from functions associated with transmission of display streams to devices associated with end-users.

9 Claims, 8 Drawing Sheets

SYSTEM AND METHOD FOR PERFORMING VIDEO COLLABORATION

FIELD OF THE INVENTION

The present invention relates generally to systems and methods for video collaboration.

BACKGROUND

Video and still pictures are components of many social networking services, and are used as vehicles to enrich the experience of the participants. Business networking, team-building/leadership training, and dating services are some of the more popular forms of the type of activity that is now being defined generically as "social networking services." Social networking services are performed in so-called "brick and mortar" (i.e., live) settings, but increasingly on or via popular web sites available through the World Wide Web (sometimes referred to as part of "Web 2.0") as well.

In typical dating social networking services, existing use of video is usually confined to simple one-to-one single or bidirectional streaming of either live or stored content. In business environments, video conferencing (many-to-many) is more popular, but is limited in its effectiveness. A common video conferencing model shows, for example, an entire conference room, or individual heads (live or stored/static headshot), plus training a camera on a shared work surface (a "talking heads" model). There are some other approaches that use audio interaction to allow users to create and play word games as a way for further relationship exploration.

All of these various services share common drawbacks and suffer from unique problems based on technological limitations, which, in turn, limit the effectiveness of the services and/or user satisfaction therewith.

SUMMARY

According to one aspect, integrating video effectively into a collaborative setting aids in the rapid breakdown of inter-personal barriers. In particular the rapid breakdown of inter-personal barriers benefits, for example, social networking services. Video based collaboration on a shared task offers improvements over simple voice-based collaborative interactions in achieving meaningful social interaction through its greater ability to communicate nonverbal emotional cues, and, with video, the complexity of the shared task can be increased over that of audio-only collaborations, thus accelerating the formation of inter-personal relationships. In some examples, by establishing a task oriented team, individual team members may experience a rapid break-down of inter-personal barriers between team members, and may facilitate familiarity with opposing team members and their skills, methods and personal styles. The accelerated breakdown of inter-personal barriers may be a valued element of some embodiments, and can be used in other social networking environments (business networking, teambuilding/leadership training, and dating services, among others). In one example, the breakdown of inter-personal barriers is facilitated by generating camaraderie between members of a team, by assigning a task that requires the cooperation and/or synchronization of the team members to achieve. According to some embodiments, setting such teams against each other in a competitive environment further facilitates the breakdown of inter-personal barriers.

According to another aspect, it is desirable to emulate face-to-face interaction as closely as possible, while realizing that face-to-face interaction is not in fact achievable or is prohibitively expensive for large populations of potential participants. Thus in one embodiment, remote communication is integrated into a collaboration session. In one example, each participant can observe how other participants behave, react, and respond to various stimuli provided during the course of completion of tasks assigned to teams. Through these readily observable interactions individual participants are given a sense of the personality and character of other participants, these impressions may facilitate future social interaction, and may enable breakdown of inter-personal barriers.

In one embodiment, richer communication models may be employed to improve upon known methods, such as the talking head model. Some embodiments employ shared video, audio, text and shared workspace, and may be effective in achieving improved social interaction. Shared video may involve the use of web-cameras attached to home computers, for delivering live streaming video during the course of task completion. In one embodiment, shared video may use pre-recorded streaming video, and other video images. Shared audio and shared text may also be used to allow participants to communicate with each other during the course of task completion. For example, team members privately communicate and synchronize the completion of an assigned task by speaking directly, and/or texting to each other (which may include the ability to observe reactions) without other teams seeing or hearing the communication. The shared video, audio, and text may all be incorporated into one display for presentation to the participants, and that further incorporates a shared workspace. The shared workspace may be the area of the display in which the assigned task itself is actually completed, or the shared workspace may provide a work-aid that will aid in the completion of the task. In one embodiment, the shared workspace is a gaming interface, where the participants play Tic Tac Toe or other game competitively.

In another aspect, the organization of the display of the shared workspace, shared video, audio and text information may be important to facilitating interaction between the participants. Display organization and the ability to automate focus on the appropriate video stream facilitate the collaboration between users. In some embodiments, screen organization and automated focus are of particular importance, and in one example where the device being used is a mobile device (cell phones, pdas, mobile phones and/or other hand held devices) screen organization and focus makes effective collaboration possible.

In one example, the display, which may include video, audio, text, and a shared workspace may be optimized for display on a particular end-user's device. For example, where an end-user is participating using a mobile device the display of the shared video, shared audio, text, and the shared workspace are focused upon independently so not to overwhelm the small screen of the mobile device, and/or not to render the components of the display in a size so small as to be ineffective. In one embodiment, only the content stream representing the parties taking a turn may be displayed and/or transmitted to a mobile device to improve the end user experience. In one example, the display of the content stream shifts focus as one team's turn ends and another begins. In another example, display of the content may be focused on the team taking a turn, with other content streams be relegated to background or partial display.

Focus may be manipulated highlighting specific streams, or by graying out and/or making transparent other streams. In one example, collaboration content may be optimized for more than one device, and in particular, the optimization of content streams sent to a mobile device may differ from content streams send to personal computer end-user. To facilitate optimization across a wide range of devices, information associated with the devices being used by end-users is received and processed as part of presenting a video collaboration session.

According to another aspect, a system architecture facilitates the optimization of both presentation of disparate collaboration streams and the optimization of transmission of the collaboration streams to particular end-user devices. In one embodiment, a system incorporates a dual gateway architecture, that segregates presentation optimization from transmission optimization of the displayed content. In one particular example, a collaboration service provider may maintain control over the presentation of the collaboration content through use of a video gateway with mixing capability, and the optimization of the presentation, and at the same time rely on a downstream video gateway to provide optimization for transmission to particular end user devices. Such segregation also enables the collaboration content streams to be optimized for devices of which the collaboration service provider has no knowledge.

According to one embodiment of the present invention, a method for performing video collaboration is provided. The method comprises receiving a plurality of video signals, wherein the plurality of video signals are generated by a plurality of end-users, grouping the plurality of end-users into a plurality of groups, assigning at least one task to the plurality of groups, and completing the at least one task by at least one member of at least one group. According to one embodiment of the present invention, the plurality of video signals comprise video streams. According to another embodiment of the invention, the video streams comprise live video streams. According to another embodiment of the invention, the method further comprises an act of rating by the at least one member of at least one group of at least one other video conference participant. According to another embodiment of the invention, the method further comprises an act of managing the plurality of video signals using a multi-video gateway architecture.

According to one embodiment of the present invention, the multi-video gateway architecture further comprises a video gateway for tuning displayed content to at least one device of the plurality of end-users and a video gateway for formatting the presentation of displayed content to the plurality of end-users. According to another embodiment of the invention, the method further comprises an act of displaying, in the workspace shared among the plurality of end-users, the video information generated by the plurality of end-users. According to another embodiment of the invention, the act of displaying further comprises displaying an application interface, which the plurality of end-users complete the at least one task. According to another embodiment of the invention, the act of displaying further comprises displaying live video generated by the plurality of end-users participating in the at least one task. According to another embodiment of the invention, the plurality of video signals comprise a plurality of encoding protocols.

According to one embodiment of the present invention, the method further comprises an act of optimizing the presentation of the displayed content for each device providing the plurality of encoding protocols. According to another embodiment of the invention, the act of optimizing the presentation of the displayed content comprises an act of determining a maximum number of video windows displayed in the at least one device. According to another embodiment of the invention, the method further comprises an act of manipulating display of the displayed content on the at least one device in response to end-user selection. According to another embodiment of the invention, the method further comprises an act of retrieving information associated with a device that generates at least one of the plurality of video signals. According to another embodiment of the invention, the method further comprises an act of optimizing the displayed content for transmission to the at least device.

According to one embodiment of the present invention, the at least one task further comprises at least one of a game, a goal to achieve, an activity to perform, a turn based game, and control of an automated device. According to another embodiment of the invention, the at least one group comprises a plurality of end-users, and wherein the act of completing the at least one task by at least one member of at least one group further comprises completing the at least one task co-operatively. According to another embodiment of the invention, the method further comprises an act of determining a social ranking based at least in part on completion of the at least one task. According to another embodiment of the invention, the method further comprises an act of determining compatibility of the end-users based, at least in part, on the social ranking. According to another embodiment of the invention, the method further comprises an act of establishing a private communication channel in response to a request by an end-user. According to another embodiment of the invention, the method further comprises an act of receiving input associated with completing of the at least one task.

According to one embodiment of the present invention, the input comprises at least one of keys selected from a mobile device, keys selected from a telephone, on-screen buttons selected from a computer display, and voice selected input. According to another embodiment of the invention, the method further comprises an act of coaching the plurality of groups through completion of the at least one task. According to another embodiment of the invention, the method further comprises an act of communicating privately between at least one end-user and a moderator. According to another embodiment of the invention, the method further comprises an act of displaying the moderator in one of the plurality of video signals. According to another embodiment of the invention, the act of coaching occurs by suggestions from a moderator. According to another embodiment of the invention, the suggestions by the moderator are related to at least one of game play and social interaction among the end-users comprising the at least one group.

According to one embodiment of the present invention, a system for video-conferencing is provided. The system comprises a first video gateway for receiving a plurality of video signals, wherein the plurality of video signals are generated by a plurality of end-users, and the first video gateway is further adapted to format presentation of video content to the plurality of end-users, a conferencing component for grouping the plurality of end-users into a plurality of groups, wherein the conferencing component is further adapted to generate at least one task for the plurality of groups and coach the plurality of groups through completion of the task, a second video gateway for receiving the plurality of video signals, wherein the second video gateway is further adapted to transmit the video content to at least one end-user in a format optimized to a device associated with the end-user.

According to one embodiment of the present invention, a method for managing video conferencing is provided. The method comprises receiving a plurality of video streams, wherein the plurality of video streams are generated by a plurality of end-users, at a first video gateway, formatting, by the first video gateway, the presentation of content to the plurality of end-users, transmitting the content to a second video gateway, and tuning transmission of the content to at least one device of the plurality of end-users. According to one embodiment of the present invention, the method further comprises an act of receiving information associated with at least one device of the end-user. According to another embodiment of the invention, tuning the transmission of the content further comprises an act of adjusting the number of the plurality of video streams displayed to an end-user in response to the information associated with the device of at least one end-user. According to another embodiment of the invention, the method further comprises an act of inserting additional content into the content.

According to one embodiment of the present invention, the additional content comprises at least one advertisement. According to another embodiment of the invention, the end-users communicate through a plurality of network service providers. According to another embodiment of the invention, at least one of the plurality of network service providers operate at least one second video gateway. According to another embodiment of the invention, the at least one of the plurality of network service providers control tuning transmission of the content to at least one device of the plurality of end-users.

According to one embodiment of the present invention, a system for managing video conferencing is provided. The system comprises a first video gateway adapted to receive a plurality of video streams, wherein the plurality of video streams are generated by a plurality of end-users at a first video gateway, wherein the first video gateway is further adapted to format the presentation of content to the plurality of end-users, a second video gateway adapted to receive content from the first video gateway for transmission to the end-users, wherein the second video gateway is further adapted to tune transmission of the content to at least one device of the plurality of end-users.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. One should appreciate that the drawings are presented by way of illustration and not by limitation. In the drawings.

DETAILED DESCRIPTION

Figure 1:
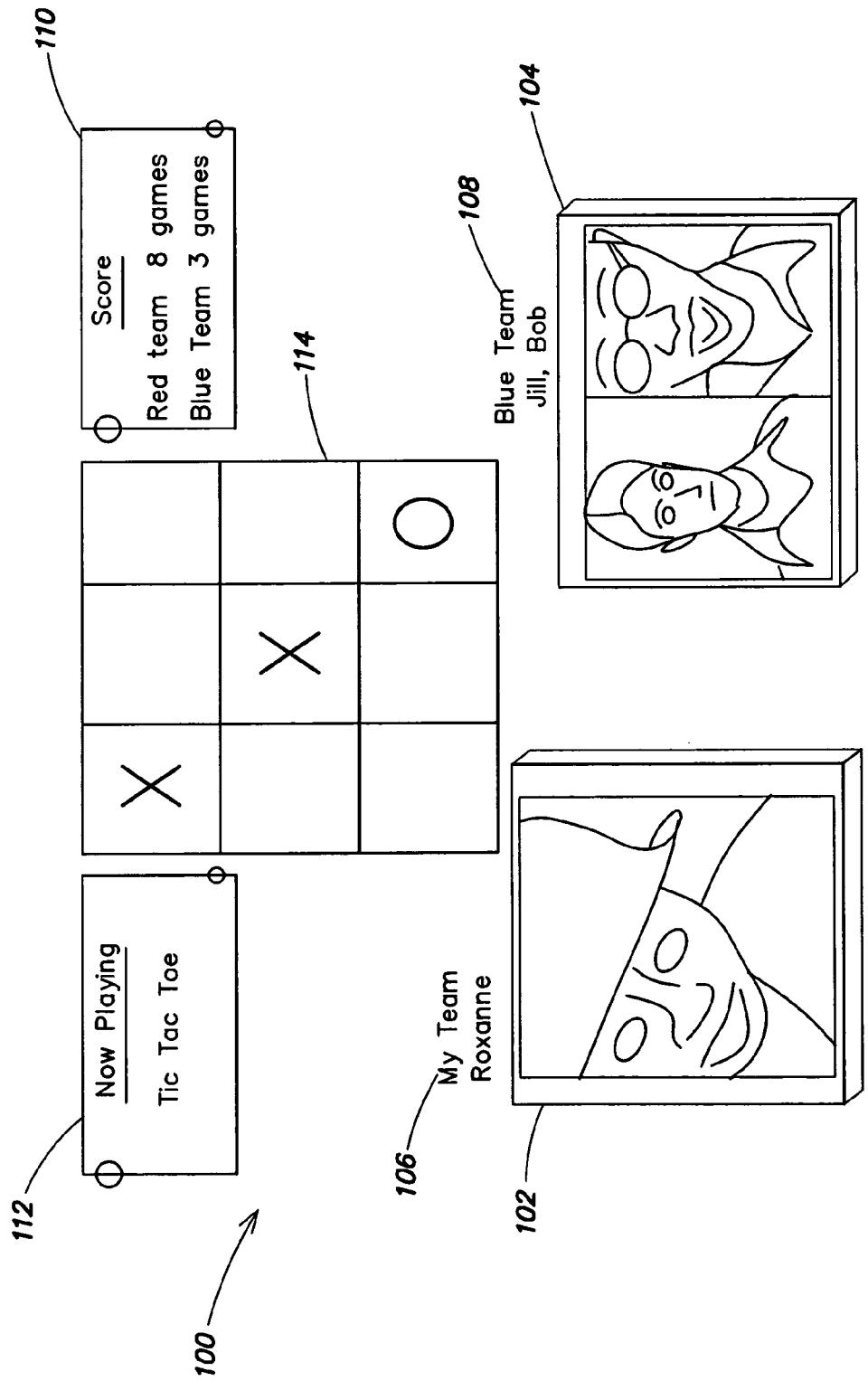
FIG. 1 is an illustration of one embodiment of an interface.

According to one embodiment, a video-enabled task-oriented method engages multiple parties in remote social interactions. Alternative embodiments of the method are suitable for static location and/or mobile social interactions. In one example, forming the parties into teams, fostering a sense of camaraderie while allowing the parties to remotely observe the reactions, responses and behavior of other participants during the completion of an assigned task, enables the breakdown of interpersonal barriers in a unique manner.

Some tasks may include mobility as a prerequisite to task completion (one example includes a scavenger hunt type game—and another example of a task includes taking video image of a team member in a known location). Remote social interactions may be targeted to include (but are not limited to) teambuilding, leadership and dating oriented interactions. In a typical example, a number of end-users log into a video collaboration service. The service may be directed toward providing social interactions, playing games, or any number of other goals as discussed in greater detail below. The video collaboration service provides a platform for establishing a video collaboration session. In one embodiment, the platform enables end-users to call in to participate in a video collaboration session. The video collaboration session involves grouping participants into teams and generating/assigning a task for the teams to perform.

In one example, the end-users may be grouped into a number of teams. In another example, two teams are created with a plurality of members in each team. A collaborative task is assigned to each team, and in one embodiment the task may be the same, and in another, the assigned tasks may be different across the teams. In one example, the task involves playing a game competitively between multiple two teams. The game may be as simple as Tic Tac Toe, or more complex depending on the interaction desired. According to different embodiments, the game selection may be random, or may be determined from scoring associated with individual users, among other options. Task selection may be the function of a coach, who may also facilitate the completion of a task by providing commentary and advice to individual end-users, individual teams, or all participants depending on what is required.

According to one embodiment, a method for video collaboration is provided. In one example, the method incorporates live video streams and/or static stored video displays of the participants along with a shared video workspace onto the same display. Each component of the display—participant views and task view—may be individually manipulated (resize, move, increase/decrease resolution) but will start with a default view that incorporates a small number of live or static video windows along with a central task window. The default view may be tuned to a particular device. Such a device may be designated in a user information record.

In one example, end-users may establish profiles with primary connection device information, as well as back-up device information. In one example, for a mobile phone, a default view may focus only on the center of the display, and require an end-user to scroll to other portions of the display to view portions of the content stream.

During the course of a video collaboration different portions of the display may be focused upon depending upon such factors as who is active at a particular time and whether team members are participating in a private conference, in which case communication between team members will not be observable by the opposite team and/or teams. In some alternatives, a coach/moderator may observe a team "huddle" (in other words private conference), and in some may provide advice on social interaction and/or task completion. In some embodiments, private communication sessions are completely private and can only be observed by the designated participants. In one display example, the private conference is rendered as an overlay over the previous game display, relegating the previous game display to the background. In another example, the content stream may not be updated for the previous display until the private conference ends, to save on transmission requirements. Other examples can include, by way of non-limiting example, displaying a grayed-out background and/or giving the grayed-out background the impression of movement.

FIG. 1 illustrates an example of a display for a video collaboration session. In particular, FIG. 1 shows a display indicating two teams that are competing together in a collaborative environment. An end-user will see a display that indicates "My Team" (106) as opposed to the displayed name for the competing team (108) "Blue Team." Red Team/My Team is composed of the viewing user, Jeff, and his partner Roxanne. The display may show both participants, or Jeff may opt to view only Roxanne's image and not receive a feedback image of himself. In this case, Jeff has opted to provide a larger viewing area for his partner's image by not viewing his own image. As such, the video window displaying "My Team" comprises only one video feed (102). Such video feed may be of live video, or may be provided as pre-recorded video or static image delivered through a media server, or other storage location. Blue Team includes two team members (end-users Jill and Bob) and Blue Team's video window (104) includes two video streams. Although one should appreciate the overall display (100) may take many forms, and may be optimized differently for different devices associated with end-users, in one example the video windows may be layered to adapt to smaller screen size, and each window coming to the forefront as it is highlighted, for example during a change of turn.

Display (100) may include a display for score (110) indicating, for example, how the teams are performing, how many game were won by either team, among other options. Display (100) may also include an indication (112) of the task being performed, which in FIG. 1 is a Tic Tac Toe game. Display (100) may also include a task window (114) that is for viewing the task being performed. The task window (114) shows the progress of a Tic Tac Toe game. Display (100) may also include advertising streams mixed into the content streams (not shown).

According to one embodiment, smaller numbers of windowed video streams are easier to place on a screen and make it easier for an end-user to receive information. Thus, organization of the display window (100) may improve interaction between end-users and facilitates video collaboration overall. In one example, organization includes focusing the display on active users, and in particular in a turn based task, focus may be shifted from team to team as turns are taken, allowing participants to be seen and/or heard while they are actively participating in the task. According to one embodiment, focusing participants attention to relevant video and/or audio display based upon game rules, or as a reaction to user-interactions such as by preceding a statement with a user's name, or as a reaction to emotional cues in a user's voice or image, improves over known methods, and enables participant to gain a more in-depth understanding of the actual people involved in the video collaboration session. Additionally, focusing attention to specific content to display enables a reduction in bandwidth requirement as the displays not being focused upon may not be transmitted to low capacity devices, for example, mobile/wireless devices.

In one embodiment, simple and well-known games are used for many basic get-to-know-you interactions, and in other embodiments more complex games for teambuilding and/or leadership training are employed. In some embodiments, training consultants may be incorporated into the task screen. In one example, the training consultant is included as an additional team member, and in other alternatives as a coach and/or mentor to the end-users.

Teams may be assigned tasks that require automated control over robotic devices viewed through a task window. Various control features for the robotic device may be separated across team members, for example, right side control being assigned to one team member with left side control assigned to another. Thus, co-operation and synchronization are required to efficiently move the robot. In another example, movement may be controlled by one team member, with control of a robotic arm controlled by another, and one example of a task may require movement of the robot to an object, capture of the object with the arm, and placement of the object in another location, with the first team completing the process being deemed victorious. Team titles may be highlighted to indicate their turn at the task. Highlighting may take many forms, including the use of colored background, texture, blinking, font, structure, among others.

During the course of a task, end-users may take actions in response to requirements of the task. Task control can be achieved through a number of methods. One embodiment includes the use of on-screen buttons (a local application or web browser may present these buttons) that could be navigated using an available terminal pointer navigation capability (e.g. touch sensitive screen, cursor ball or thumb dial functionality, or basic keypad mapping as up/down, left/right and "enter"). Another embodiment includes the use of standard telephone keypad generated DTMFs that are interpreted by a remote media server as commands. For example, Tic Tac Toe might use the standard 10 digit phone keypad with digits "1" through "9" mapping directly to squares on the screen, and the "0" to confirm the move. As another example, chess and checkers could use alternate keypad numbering schemes using two or more key strokes to identify a playing token and its destination. Another embodiment includes either local or remote speech recognition.

In one embodiment, another function that may be enabled during the course of video collaboration is the ability for a team to "huddle", that is enter and return from a discussion without the other team hearing. In one alternative, a coach may huddle with any individual member of any team, i.e. converse privately, via a private stream that presents one of audio, text, and/or video (or any combination thereof) to that team member. In another alternative, the coach may huddle with a team or teams, excluding some, none, or different groupings of end-users.

According to another embodiment, rating and recommendation systems are incorporated to enhance the user experience by making better intra-team assignments and team match pairings, and narrowing down a set of possible selections by qualifying user history and matching with the ratings associated with users. In one embodiment, ratings are compiled on the individuals in reference to both their skill at the associated task and in the quality of their interactions. In another embodiment, task ratings are used at least in part to identifying the type of task to select for a particular group of end-users. Recommendations are then made depending on the relative task and personal interaction skill levels, along with other relevant information gathered by the service. Such ratings of users are provided during or after matches by other match participants including users, coaches, mentors and/or moderators.

Figure 2:
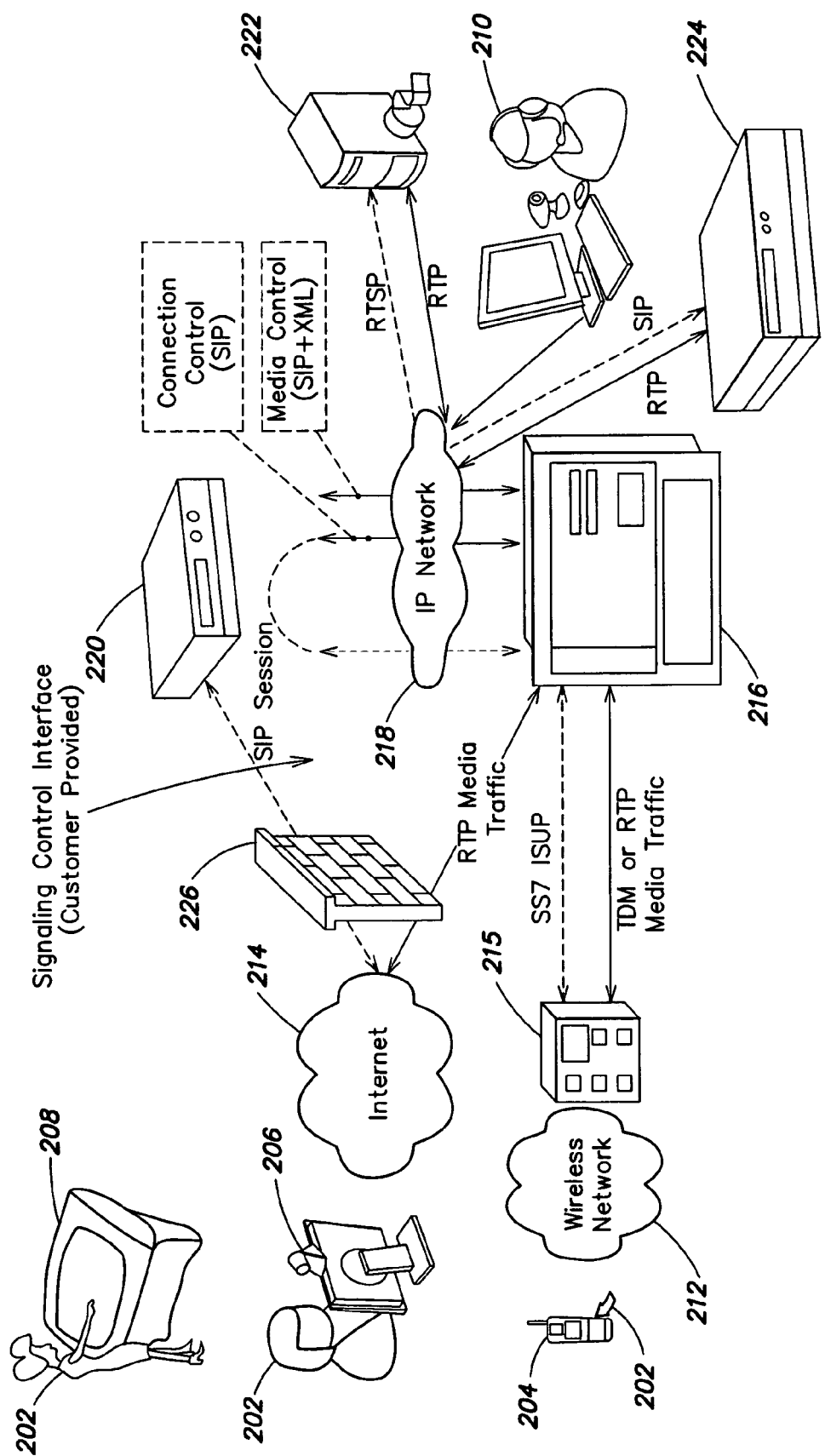
FIG. 2 is a block diagram of an exemplary architecture upon which various embodiments of the invention may be implemented.

Referring to FIG. 2, in one embodiment, consumers of the service (202) use a diverse set of terminals for viewing and sending video including wireless phones (204), PC based softphones (206) or service kiosks (208) to communicate over a communication network (212-214) (for example, the Internet 214, and in other, for mobile participants through a wireless network 212 and/or the Internet 214). Mobile communication may require a Mobile Switching Center (MSC 215) to communication with a video server/gateway (216). Certain coached or monitored interactions could also include call center agents (210).

Agents may participate in a video conference session from a call center belonging to the service provider (and be connected directly to the communication network (e.g. 218 IP Network), or may come from a service hosted by a company that specializes in call center services, and be connected to the service provider through another communication network (not shown). In one example, the call center agent(s) act as game and/or social interaction coaches. In another example, the coach receives information from the same collaboration view that the players are using, and in one alternative, shares a desktop or application view with one or more of the participants.

The coach may also control certain elements (difficulty, intermediate states, final outcome) of the task. By controlling elements of the task the coach encourages specific social interaction goals, and may focus on certain members of a team, requiring their interaction to achieve the team goal, among other possibilities.

Application Server (220) provides control of video streaming and mixing based on service operational rules and end user (202) and agent (210) initiated signals provided through end-users' devices (e.g. DTMF tones, or via a control and media streaming protocol transmitted over communication networks (212, 214, and 218)). Media Server (222) delivers for example, stored photos, video and/or video/stills generated in response to game player activity over communication network (218) and in some embodiments other Media Server(s) (e.g. 224) may also provide pre-recorded visual content such as background scenes or recorded task sessions using different transmission protocol(s). In one embodiment, a video collaboration service may be protected from improper access through use of a firewall (226).

Figure 3:
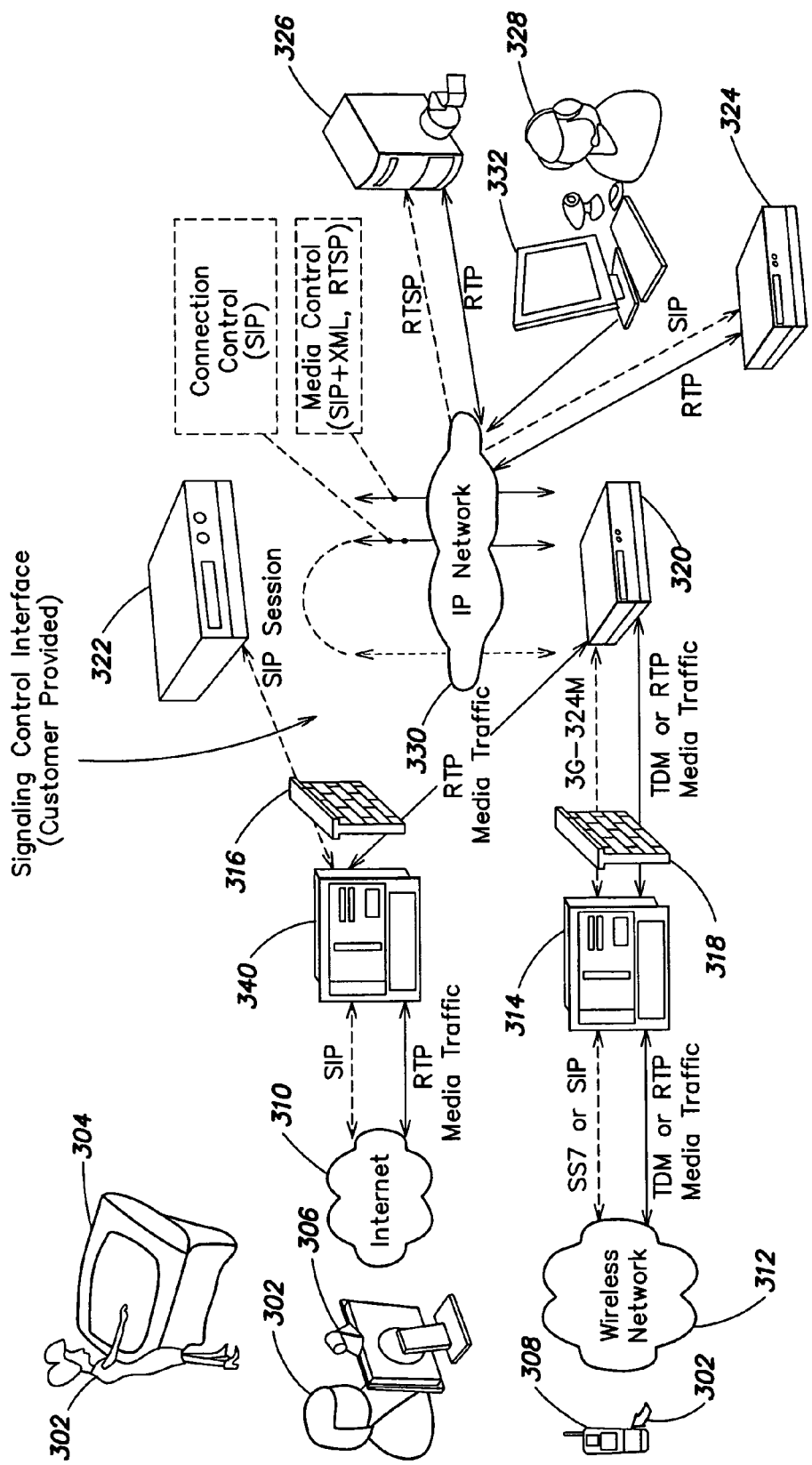
FIG. 3 is a block diagram of an exemplary architecture for facilitating implementations of various embodiments of the invention.

Referring to FIG. 3, an example architecture is described for facilitating video collaboration. Shown is a dual media gateway implementation, however, one should appreciate that the invention is not limited to the dual media gateway described and for example, additional media gateways may be implemented in other architectures.

The example architecture for a video collaboration service illustrates three primary consumer terminal types (although one should appreciate that the generalization to three types is not intended to be limiting, but rather, is used for purposes of simplification, and other types/classes of end-user devices using other classes/types of communication protocols intended to be covered by the disclosure):

- Wired or wireless kiosk using 3 G324 M and/or Session Initiation Protocol (SIP) for control and media streaming through Real Time Protocol (RTP)
- General purpose computer with wired and/or wireless Internet Protocol (IP) connection running a SIP softphone application
- Cell phone connected to either a traditional cellular network or wireless IP network (including 2.5 G, 3 G or later cellular networks with IP transmission capabilities, or a wifi enabled cell phone).

Some other examples of wired and wireless IP devices include Portable Digital Assistants (PDA) and tablet and laptop computers, among others.

Referring again to FIG. 3, end-users (302) operate communication devices (304 kiosk; 306 home computer with webcam; 308 cell phone) to communicate over a communication network (e.g. 310 Internet; 312 Wireless Network) to a video collaboration service provider. In one embodiment, mobile end-users communicate through a carrier video gateway (314) to reach the video collaboration service provider and fixed end-users communicate through a carrier video gateway (340). Shown, to the right of firewalls (316-318), is a video collaboration service provider and application service provider terminals and network components (320-330). In this example, the call center agent (328) has a video and audio capability provided by a webcam with a SIP softphone (332), or in one alternative (not shown) in combination with a standard desk phone set and video capture and streaming software.

A call center agent may also communicate through text and other vehicles. In one embodiment, a call center agent is connected directly to communication network (330), while in an alternative the call center agent may be outside of the video conference service, and may also a member of a call center service.

The streaming Media Server (326) may deliver stored photos, video and/or video/stills generated in response to end-user activity (i.e. team member actions taken during the completion of an assigned task). In addition to rendered task image(s), this and other streaming Media Servers (e.g. 324) may provide pre-recorded visual content such as background scenes or recorded task sessions. In one example, the streaming Media Server (326) comprises a common internet Media Server with Microsoft Media Player, Real Networks Helix, Apple QuickTime and/or Flash media server software that uses Real Time Streaming Protocol (RTSP) as the streaming control protocol. One should appreciate that the Media Server (326) could also use other standard and/or proprietary control and/or data streaming protocols and may provide one, others, or some of the media interfaces enumerated.

In one example, Media Server (326) comprises a multi-player gaming server—for providing game based tasks to end-user participants. In one embodiment, the Application Server (322) controls video streaming and mixing based on service operational rules and end user and agent initiated signals provided either through DTMF tones, or via a standard or proprietary control and media streaming protocol transmitted over IP.

Shown in FIG. 3, the example dual Media Gateway architecture is suited for implementing video collaboration services and enables broader final stream composition options, and enables for example a Network Service Provider (NSP) to adapt the video format to work best with the terminal device(s) of the end-users.

In the implementation shown in FIG. 2, a single media gateway (216) provides final video composition, screen size/pixel interpolation, transcoding, and frame rate selection. In alternative embodiments, such a media gateway can operate in either NSP facilities, or (via a 3G324M or SIP connection for example) it could reside in the content provider/call center service provider facilities, or in the facilities of an Application Service Provider (ASP) selected by either the content provider/call center owner or the Network Service Provider. When the gateway is located in an NSP or ASP facility it is commonly referred to as "hosted" and the NSP or ASP is the Hosting Service Provider.

In one embodiment of the single Media Gateway architecture, the model has a single business entity that controls the final content of the video stream, and the transrating and transcoding functions are placed within the same server as the final composition/stream mixing software. Typically, placing transrating/transcoding functions in the same server as the final composition/stream mixing functions reduces costs. In one embodiment, transrating and transcoding settings are optimized for a particular terminal device; this is especially true when the terminal device is a cell phone, for example. When the device is a general purpose computer, the stream is not usually transrated or transcoded. In order to identify the device for optimization of the media stream, information (phone manufacturer, model, software revision) must be used. In the single Media Gateway architecture, such information may only be available to the Network Service Provider, and may not be passed along to the video collaboration service.

A multi-Media Gateway architecture, shown by an example of a dual-media gateway implementation in FIG. 3, increases the final stream composition options while retaining the ability of, for example, a NSP to adapt the video format to work best with the terminal device(s) associated with end-users. Referring again to FIG. 3, the Enterprise Video Gateway (320), which in some embodiments, may also have Media Server functionality, formats and mixes the content as the video collaboration service wishes it to be presented to the viewer.

In some embodiments, the Enterprise Video Gateway (320) may include Media Gateway functionality as the source streams may be provided through different control and data stream standards, such as SIP/RTP, RTSP/RTP, and other standard and proprietary signaling and/or data protocols, as well as other signaling protocols, and converts those disparate input protocols into at least one output. The Enterprise Video Gateway (320) may be hosted by an ASP or located in the video collaboration service provider's premises. With the Enterprise Video Gateway providing the final version of the image as preferred by the enterprise, the Carrier Video Gateway (314) includes features for tuning the media stream to work best with the terminal device(s) associated with end-users.

In one alternative, the Carrier Video Gateway may add in additional content, for example, prepended or appended ads and information, and/or ads and information that are mixed in real-time directly into the Enterprise Video Gateway video stream. An example of the latter would be where the NSP streams text superimposed across the bottom of the video image, or when a specific area of the video image is assigned to the NSP to place ads as a method for NSP/enterprise revenue sharing.

According to one embodiment, a dual media gateway architecture enables effective video collaboration over fixed line devices (personal computers, kiosks, etc.) and mobile/wireless devices (cell phones, mobile phones, pdas, tablets, etc.). The use of the dual gateway architecture allows for the receipt of information regarding end-users devices that may not be available to the host of a video collaboration service. One particular example includes a cell phone as an end-user device, where the information regarding the particular device is captured by a NSP operating the wireless network over which the end-user device communicates. In a dual gateway implementation, the NSP may optimize the delivery of the content to the particular device (e.g. a cell phone) while the video collaboration service provider controls the presentation of the display for that particular end-user. The separation of these elements and/or the architecture that enables this separation, according to one embodiment, makes effective video collaboration possible on small form factor mobile devices, and/or accounts for the limited bandwidth available to those devices.

According to one embodiment of a multi-Media Gateway Architecture, the video collaboration service provider is able to:

Retain control of their video content
Incorporate disparate types of content streams
Optimize content presentation by being able to access the latest in video mixing capabilities
Engage in a revenue sharing model with other service providers
Separate device format optimization to, for example, a NSP for specific device tuning even where the information is not available to the Enterprise Media Gateway.

One should appreciate that different embodiments, may incorporate one, some, none, different, and/or combinations of the features described.

Figure 4A:
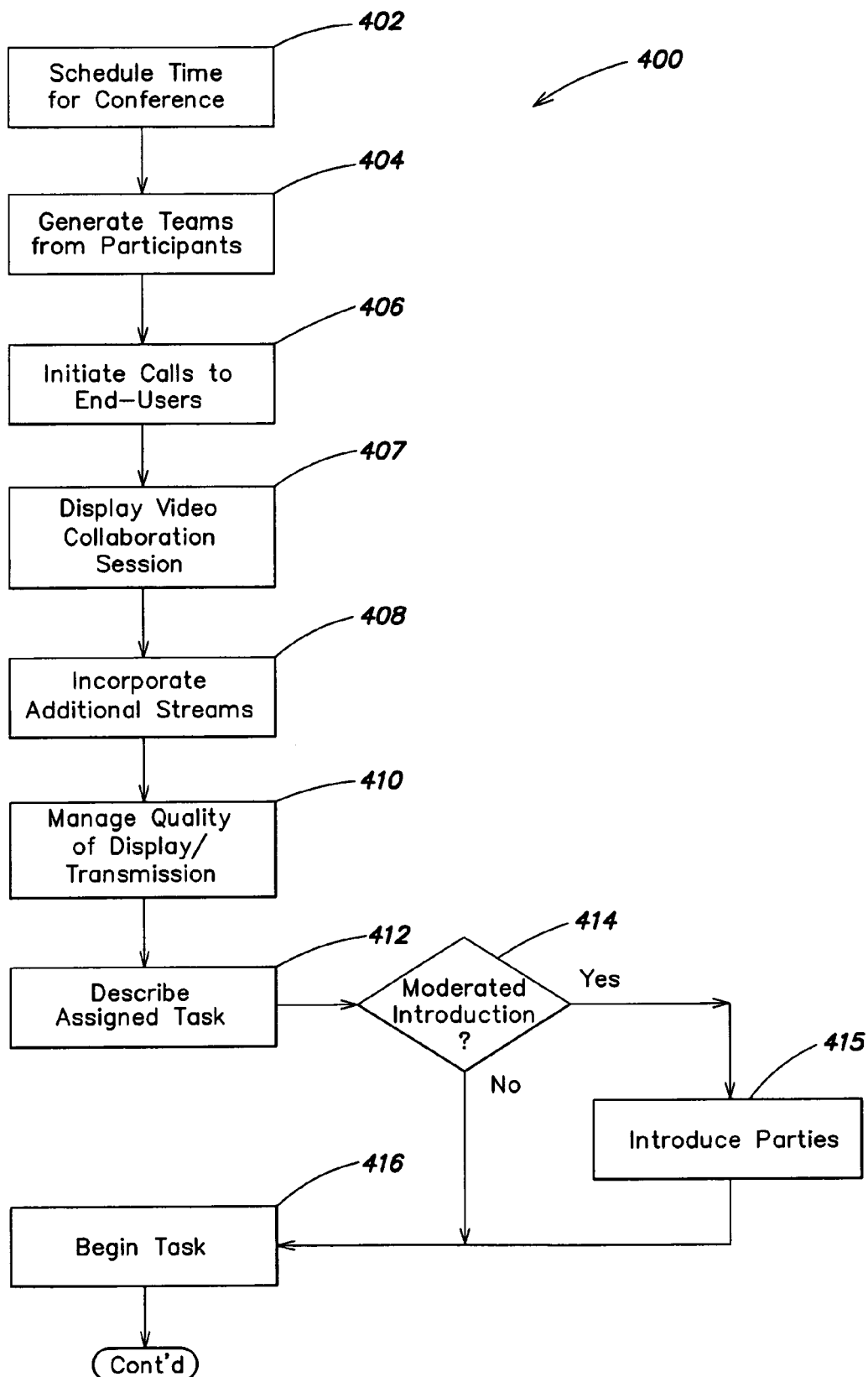
FIGS. 4A-B show a flow diagram of an exemplary process for performing a video collaboration session.
Figure 4B:
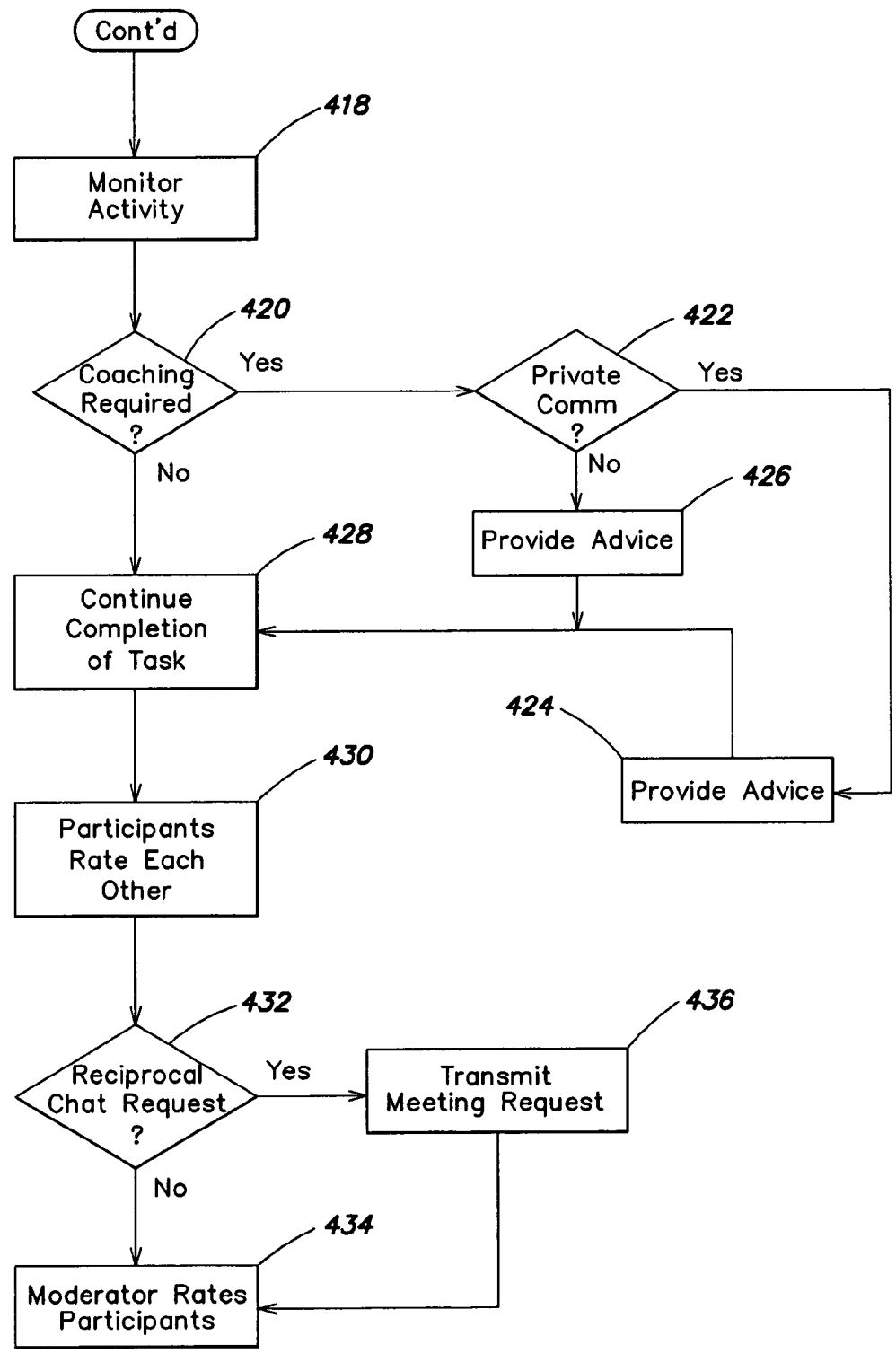

FIG. 4 illustrates an example of a process 400 for conducting a video collaboration session. In particular, process 400 describes a video collaboration session for a dating service provider. In one embodiment, a video collaboration session may be scheduled for a particular time (402) and participants may sign up to participate at that time. In another embodiment, participants indicate the desire to participate, and are given a scheduled time. In an alternative, participants may agree to a particular time. In one example, the session time was reserved, and all participants are called at the reserved time (406). Once the calls are complete the video collaboration session is displayed at their preferred video-enabled terminal (407).

Teams are created from the end-users registered to participate (404). In one example, Bob and Carol are teamed up to play against Ted and Alice (404). Bob and Carol are working from their home computers and Ted and Alice are both traveling for work and using their video-enabled cell phones. One should appreciate that teams may be assigned before, at the same time, or after a video collaboration session is scheduled. In one embodiment, a Moderator, Chris, will assist in the session and analyze the interaction for rating of the participants. Chris may be at a video enabled workstation in the dating service facilities, for example, or Chris may be in a remote location, or be part of a call center service provider.

Alice's cell phone video service is partially ad supported, meaning that Alice needs to occasionally view ads that scroll across the bottom of the video screen (the video streams of the ad and the collaboration session may be mixed (408) in either the carrier video gateway, or prior to sending the complete stream to the carrier gateway for transcoding and transrating optimizations to work best with Alice's cell phone). In other embodiments, ads may be segregated to particular portions of a display screen, among other options.

Ted is a systems administrator at a large distributed company, and as part of his cellular service, receives text notifications when critical IT department issues arise. In a manner similar to Alice's advertisement integration, Ted's alerts may be integrated into scroll across the bottom of the screen when he is engaged in a video call (408). Additionally such alerts may be segregated to specific sections of Ted's display for the video collaboration, among other options. One should appreciate that the additional streams that may be integrated into a video collaboration session are not intended to be limited, and almost any media stream may be incorporated, or converted into a media stream for incorporation.

Bob and Carol are connected through the Internet (at 406), so the carrier video gateway may be owned and/or operated by the IP service provider that the dating service provider uses for both internet access and/or managed bandwidth to remote office and points-of-presence. In one embodiment, the carrier video gateway provides quality management (410) through the generally unmanaged Internet by optimized routing (in one example, using different paths through the Internet) and video stream codec changes to change bandwidth utilization (e.g. higher quality/higher bandwidth when error rate is low, and lower quality/lower bandwidth when error rate is high) with streaming error rate values based on, for example, Real Time Control Protocol (RTCP) error reporting.

In one example, end-users install a dating service client application on their computer. The application's user interface contains controls and a window where the streaming video is presented. In another example, end-users use their cell phone keypad to control the video collaboration. A collaborative task is assigned and the details of the tasks are provided (412) as part of the video collaboration session. The tasks may be any number of activities, and in one example include a game. In the case of the game, instructions on how to play may be provided as well. As Bob and Carol are connected through home computers, they will play the game using gaming controls presented with the streaming video (416). Ted and Alice use cell phone keys to send Dual Tone Multi Frequency (DTMF) in-band signals to the dating service enterprise media gateway in order to play the game (416), where they trigger an event that is sent to the application server, and removed (tone clamping) from the audio streams that will be mixed and sent back out to all participants.

In one embodiment, an application server initiates an outgoing call to each participant (406). When the call is answered the streaming media server sends to each of the participants an introductory message indicating the assigned task (412) and that provides a description of the goals for the session and the game controls. Tasks may take many forms, and in some embodiments include competitive games.

At 414 (YES), Chris, the moderator, asks each participant to introduce themselves (415), they do so and the game is started (416). Otherwise, at 414 (NO), the participants introduce themselves and begin play of the game (416). In one example, a game for a collaboration session comprises a modified Tank Commander game where each team cooperatively runs a tank and competes against the second team's tank. In one example, a game server outputs a standard media stream using RTSP to control the session and RTP/RTCP for the video media stream. The Enterprise gateway converts this to SIP and RTP/RTCP and mixes in with the video streams coming from the participants' terminals. The Enterprise Gateway may also mix the video stream showing a game scoreboard, and appropriately frame the game and participant video streams.

Within the game, one team member is responsible for moving the tank in two dimensions and controls the tank speed and brakes. The other team member rotates the turret, changes gun elevation and fires the gun.

As the game commences, Chris monitors the activity (418) and jumps in to coach Bob (420 (YES)) when he raises his voice to Carol telling her to, "Move the damn tank already!" None of the other players can hear Chris as s/he has selected a private communication with Bob (422 (YES)). The moderator may choose to communicate privately at (422 (YES)) or may select non-private communication (422 (NO)). Non-private communication may be used to provide advice to a whole team, multiple teams, and/or combinations of individuals from separate teams, among other options. In one example, a moderator is provided with an interface for selecting participants to communicate with and whether such communications should be private. Where advice is necessary, a moderator may attempt to assist play of the game at 424 and/or 426, or the moderator may provide advice on how to interact with other team members. In example process 400, Chris may remind Ted not to take the collaborative game too seriously at 424. Such advice may take many forms, and may include pausing the task (in example process 400, the game) to, for example, switch team member responsibilities.

Where no coaching is required (420 (NO)) game play continues until completion (428). After the game completes, with Ted and Alice the winners, each of the players rates their partners and competitors (430), ratings may include scores for poise, politeness, humor, game skill and/or social compatibility, among other options. The players may also request a private chat session with any of the other players. If the request is reciprocal (432 (YES)), the application server will send out a meeting request to those participants (436). If the request is not reciprocal (432 (NO)) no meeting request is sent. Alternatively, where requests are not reciprocal, the requested party may receive a notice of a request and a further option of authorizing a chat session.

The moderator, Chris, also rates all the players (434). The moderator's ratings may occur against a larger set of attributes, and those scores may be added to the data used to match potential teammates in future collaborations.

One should appreciate that process 400 is shown by means of example only, and that certain steps may be performed in a different order, may be omitted entirely, and different embodiments may include steps not explicitly recited in example process 400. One should also appreciate that for purposes of understanding process 400 has been shown as a set of discrete steps, in some embodiments the steps disclosed may be repeated and/or performed throughout a video collaboration session. In one embodiment, no moderator participates, and in such an embodiment the steps related to coaching would be omitted.

According to one embodiment, task oriented interactions are common elements of both business teambuilding and dating encounters. The focus on the task at hand rather than the desired end-goal allows communications to be initiated more organically, and to get a truer understanding of the other person(s).

Other embodiments are implemented in different environments, and some applications within those environments include:

Personality or cognitive testing—The game and other players would be selected, and possibly scripted, to pose certain challenges to the testee whose responses would be evaluated against target and abnormal/exceptional possible responses. Sequences of tests could be archived, recorded, and/or stored for progressive analysis or more thorough interpretation of individual characteristics.

Behavioral analysis and/or therapy—Behavioral analysis and/or therapy sessions may incorporate recording team collaboration sessions, and may also include having a therapist operate as the coach/moderator for a collaboration session. In such a setting the task assigned to the team may be selected by a therapist or physician desiring to obtain recordable characteristic responses of a subject member or members of a team. In such a setting the therapist and/or physician may facilitate the completion of the task, or may impede the completion of the task to view and/or record reactions. Tasks may include games that challenge a subject to interact socially, and in some examples may be designed as part of a course of therapy.

Hiring—The applicant would engage in an interaction session with a recruiter or other applicants who is/are looking for a set of personality attributes that could be drawn out in a competitive/collaborative session. In one alternative in this setting, an employee may interact with the applicant as a collaborative team member, to better determine the applicant's fit to a real world team. In another, the employee may compete with the candidate to make such a determination. Various embodiments disclosed, may be used with respect to personality or cognitive testing could for screening potential employees. In one embodiment, a minimum cognitive score could be required to qualify for an open position. Some employers require certain characteristics, for example the hiring decision may be influenced by a desire to hire "risk averse" employees. Other situations and other employers could focus on other criteria based on desired characteristics and/or personality traits.

Training—A collaborative task may be established as a means of teaching new skills in a collaborative environment. In one embodiment trainers may be team members and influence and/or teach teammates how to complete the particular task. In another embodiment, the population that is desired to be trained may be assisted by a trainer as a coach. The trainer may provide one-to-one advice, communicate privately to individual team members, and/or facilitate the completion of tasks on a team by team basis. In one alternative, collaborative tasks are assigned to teams in order to establish rapport among employees that will participate in a training session. Breaking down interpersonal barriers prior to engaging in training sessions may lead to improved performance, participation, and/or adoption of the new techniques.

Brainstorming—Brainstorming sessions are often characterized by a slow start and usually require all players to be present. This method could be applied as a pre-session exercises, where all participants need not be present, to accelerate the rate of participation.

Ad-hoc artistic group formation (e.g. music jam, poetry slam)—The task screen contains something—a musical score, an emotion, a situation—which the ad-hoc team uses as a stepping off point. In one embodiment, the goal of the exercise is to identify other artists who have complementary styles for further collaboration.

In one embodiment, a dual media gateway architecture is used to host a video collaboration service that caters to end-users having a variety of communication devices. The video collaboration service integrates the various functionality discussed above with respect to methods of video collaboration in certain embodiments. In particular, the service groups end-users in teams that are assigned tasks to be completed. The service may provide a coach/moderator to assist the team(s) in the completion of the task. The coach/moderator may also control various elements of the task to increase/decrease difficulty, and/or to facilitate specific social interaction. In one embodiment, the coach/moderator is a disinterested party with respect to the completion of the task, and any assistance rendered in task completion is secondary to facilitating social interaction between the participants.

The dual gateway architecture facilitates certain features within the video collaboration service, and one particular example includes, the use of private communication between participants, and between the coach/moderation and the participants, either individually and/or in groups. The dual gateway architecture also provides the option of crafting displays of the video collaboration session to effectively display on mobile devices. In particular, the dual gateway architecture may facilitate displays with a reduced number of presentation windows, with the presentation windows representing video stream from other participants, and/or an application service rendering the game play display.

The dual gateway architecture may facilitate focusing options for mobile devices, so that only the active video information is shown in a mobile device display. Active video information may include the video stream (and any audio, text, and/or advertising inserts) generated by the currently active team, and/or the task or other team video stream. Limiting the display, according to one embodiment, ensures that the end-user is not overwhelmed with information on a device not capable of presenting it all in a usable fashion. In addition to focusing options, according to one embodiment, the dual gateway architecture facilitates bandwidth reduction features that enable mobile devices to participate effectively in video collaboration sessions. In particular, selections may be made to limit the transmission of certain video information (e.g. non-active video information) to mobile devices in order to reduce bandwidth requirement to participate in a video conference session. Selections may also include transmitting non-active video information in a reduced resolution until an end-user selects it, for example.

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate video collaboration according to various embodiments of the invention. Further, the system may be located on a single computer or may be distributed among a plurality of computers attached by a communications network.

A general-purpose computer system according to one embodiment of the invention is configured to perform any of the described functions, including but not limited to receiving text, audio, and/or video streams, transmitting text, audio, and/or video streams, transcoding multiple formats of content streams, transrating content streams, hosting a video collaboration service, communication over communication networks, displaying content streams, displaying a user interface for controlling display of a content stream, displaying a user interface for participating in a video collaboration session, as well as providing private communication channels within content streams, and/or displaying interface controls for accessing private communication, etc. Additional functions may also include text, audio, and/or video chat services, mixing advertising content into content streams, mixing additional content streams into video collaboration sessions, interpreting signals generated from end-user devices into desired actions within collaborative tasks, task selection, task generation, team selection, team generation, functions associated with moderating a video collaboration session, providing a shared video workspace, providing a shared workspace, etc., and the invention is not limited to having any particular function or set of functions.

Figure 5:
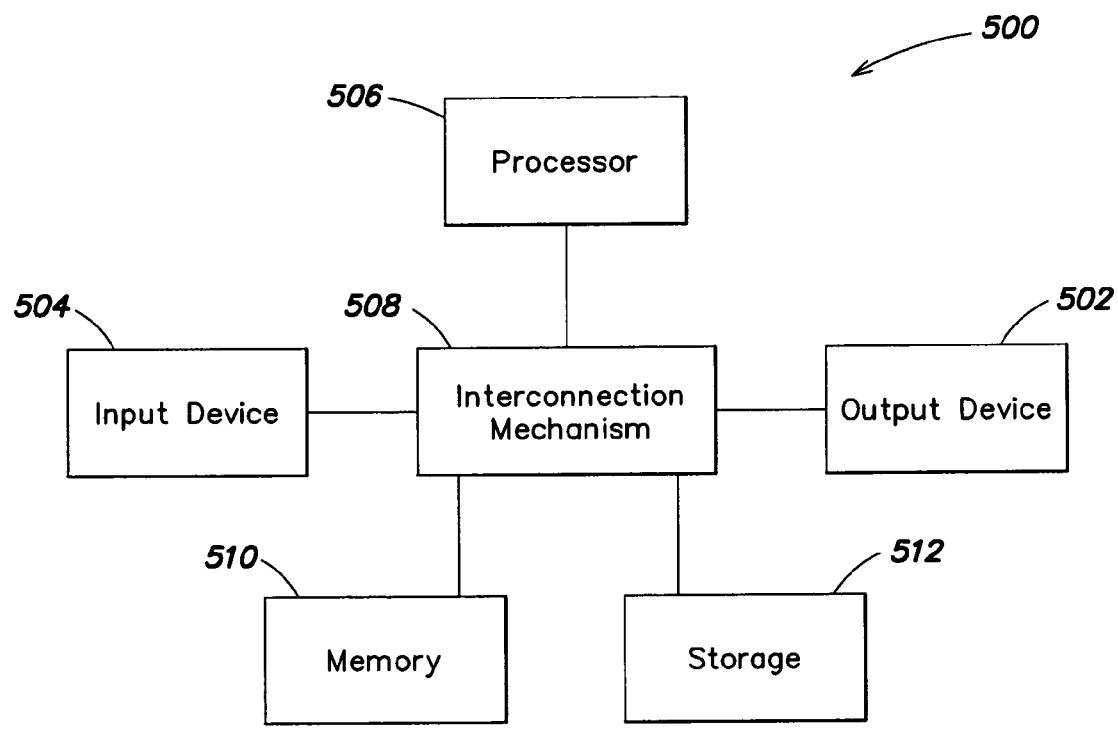
FIG. 5 is a block diagram of a general-purpose computer system upon which various embodiments of the invention may be implemented.

FIG. 5 shows a block diagram of an example of general purpose computer system 500. For example, various embodiments of the invention may be implemented as specialized software executing in one or more computer systems including general-purpose computer systems 704, 706, and 708 communicating over network 702 shown in FIG. 7. Computer system 500 may include a processor 506 connected to one or more memory devices 510, such as a disk drive, memory, or other device for storing data. Memory 510 is typically used for storing programs and data during operation of the computer system 500. Components of computer system 500 may be coupled by an interconnection mechanism 508, which may include one or more busses (e.g., between components that are integrated within a same machine) and/or a network (e.g., between components that reside on separate discrete machines). The interconnection mechanism enables communications (e.g., data, instructions) to be exchanged between system components of system 500.

Computer system 500 may also include one or more input 504/output 502 (I/O) devices 504, for example, a keyboard, mouse, trackball, microphone, touch screen, a printing device, display screen, speaker, etc. Storage 512, typically includes a computer readable and writeable nonvolatile recording medium in which signals are stored that define a program to be executed by the processor or information stored on or in the medium to be processed by the program.

Figure 6:
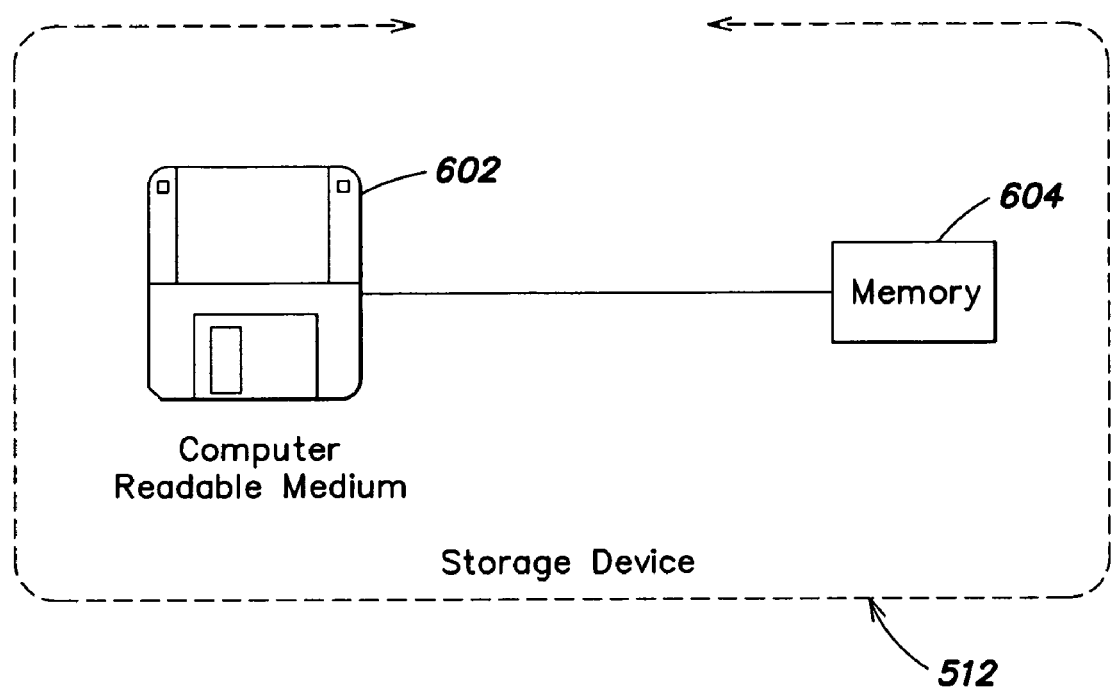
FIG. 6 is a block diagram of a storage medium with which various embodiments of the invention may be practiced.

The medium may, for example, be a disk 602 or flash memory as shown in FIG. 6. Typically, in operation, the processor causes data to be read from the nonvolatile recording medium into another memory 604 that allows for faster access to the information by the processor than does the medium. This memory is typically a volatile, random access memory such as a dynamic random access memory (DRAM) or static memory (SRAM).

Referring again to FIG. 5, the memory may be located in storage 512 as shown, or in memory system 510. The processor 506 generally manipulates the data within the memory 510, and then copies the data to the medium associated with storage 512 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Embodiments of the invention may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various embodiments of the invention may be practiced, it should be appreciated that embodiments of the invention are not limited to being implemented on the computer system as shown in FIG. 5. Various embodiments of the invention may be practiced on one or more computers having a different architectures or components than that shown in FIG. 5.

Computer system 500 may be a general-purpose computer system that is programmable using a high-level computer programming language. Computer system 500 may be also implemented using specially programmed, special purpose hardware. In computer system 500, processor 506 is typically a commercially available processor such as the well-known Pentium class processor available from the Intel Corporation. Many other processors are available. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various embodiments of the invention may be distributed among one or more computer systems (e.g., servers) configured to provide a service to one or more client computers, or to perform an overall task as part of a distributed system. For example, various embodiments of the invention may be implemented on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the invention may be programmed using an object-oriented programming language, such as Java, C++, Ada, or C# (C-Sharp). Other object-oriented programming languages may also be used. Alternatively, functional, scripting, and/or logical programming languages may be used. Various embodiments of the invention may be implemented in a non-programmed environment (e.g., documents created in HTML, XML or other format that, when viewed in a window of a browser program, render aspects of a graphical-user interface (GUI) or perform other functions). Various embodiments of the invention may be implemented as programmed or non-programmed elements, or any combination thereof.

Various embodiments of this invention can be implemented by one or more systems similar to system 500. For instance, the system may be a distributed system (e.g., client server, multi-tier system) comprising multiple general-purpose computer systems. In one example, the system includes software processes executing on a system associated with a end-user (e.g., a client computer system). These systems may permit local access to video collaboration services, or may permit remote access to video collaboration functions, an end-user and/or a moderator/coach may participate in a video collaboration session as discussed above, among other functions. There may be other computer systems that perform functions such as mixing content streams, storing, and accessing stored video images, static images, etc, and transcoding functions, as well as transrating functions, task completion and/or control, as well as game play management, and display formatting/rendering. These systems may be distributed among a communication system such as the Internet. One such distributed network, as discussed below with respect to FIG. 7, may be used to implement various embodiments of the invention.

Figure 7:
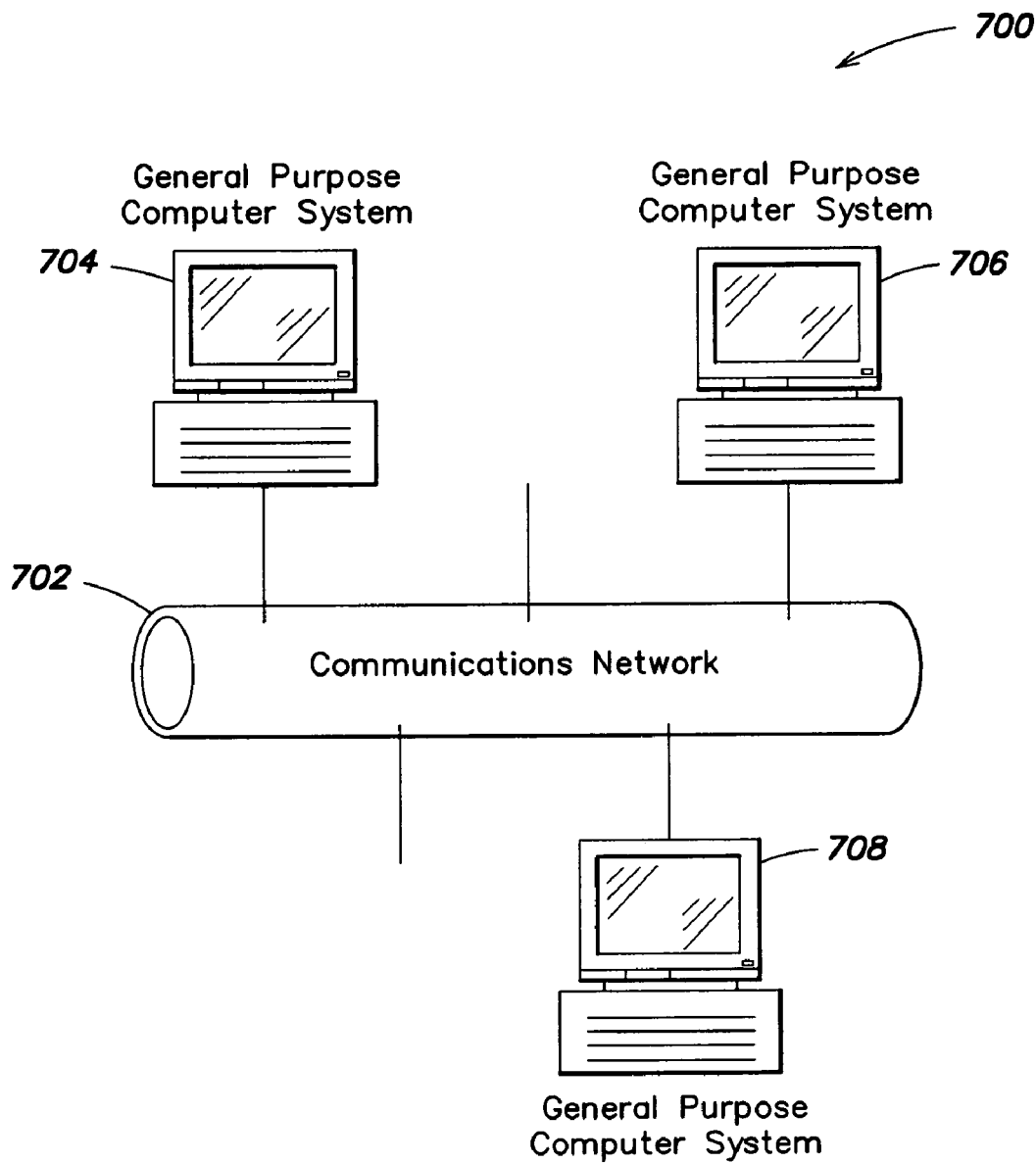
FIG. 7 is a block diagram of an example architecture upon which various embodiments of the invention may be implemented.

FIG. 7 shows an architecture diagram of an example distributed system 700 suitable for implementing various embodiments of the invention. It should be appreciated that FIG. 7 is used for illustration purposes only, and that other architectures may be used to facilitate one or more embodiments of the invention.

System 700 may include one or more general-purpose computer systems distributed among a network 702 such as, for example, the Internet. Such systems may cooperate to perform functions related to video collaboration. In an example of one such system for a video collaboration session, one or more end-users operate one or more client computer systems 704, 706, and 708 through which collaborative content is generated and transmitted. It should be understood that the one or more client computer systems 704, 706, and 708 may also be used to access, for example, a service for providing collaborative video sessions based on various embodiments of the invention as well as enabling the generation of collaboration content, and for example game play to complete collaborative tasks assigned to teams. In one example, end-users interface with the system via an Internet-based interface.

In one example, a system 704 includes a browser program such as the Microsoft Internet Explorer application program through which one or more websites may be accessed. Further, there may be one or more application programs that are executed on system 704 that perform functions associated with video collaboration. System 704 may include one or more local databases including, but not limited to, information relating to collaboration content, end-users rankings, team selection criteria, task selection criteria, available tasks, available games, among others.

Network 702 may also include, as part of the system for video collaboration one or more server systems, which may be implemented on general purpose computers that cooperate to perform various functions of the system for video collaboration including receiving text, audio, and/or video streams, transmitting text, audio, and/or video streams, transcoding multiple formats of content streams, transrating content streams, hosting a video collaboration service, communication over communication networks, displaying content streams, displaying a user interface for controlling display of a content stream, displaying a user interface for participating in a video collaboration session, as well as providing private communication channels within content streams, and/or displaying interface controls for accessing private communication, text, audio, and/or video chat services, mixing advertising content into content streams, mixing additional content streams into video collaboration sessions, interpreting signals generated from end-user devices into desired actions within collaborative tasks, task selection, task generation, team selection, team generation, functions associated with moderating a video collaboration session, providing a shared video workspace, providing a shared workspace, etc., and other functions. System 700 may execute any number of software programs or processes and the invention is not limited to any particular type or number of processes. Such processes may perform the various workflows associated with the system for video collaboration.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Further, for the one or more means-plus-function limitations recited in the following claims, the means are not intended to be limited to the means disclosed herein for performing the recited function, but are intended to cover in scope any means, known now or later developed, for performing the recited function. In addition, as used herein, whether in the written description or the claims, the terms "comprising", "including," "containing," and the like are to be understood to be open-ended, that is, to mean including but not limited to. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for video-conferencing, the system comprising:
  a first video gateway computer system operative to format presentation of video content of a plurality of video streams to a plurality of end-users, the video content representing at least one aspect of a video collaboration session involving the plurality of end-users;
  a video conferencing computer system communicably coupled to the first video gateway computer system, the video conferencing computer system being operative:
    to group the plurality of end-users into a plurality of groups,
    to generate at least one task for the plurality of groups, and
    to coach at least some of the plurality of groups through completion of the at least one task, thereby facilitating the video collaboration session involving the plurality of end-users; and
  at least one second video gateway computer system communicably coupled between the first video gateway computer system and the plurality of end-users, the second video gateway computer system being operative:
    to receive the plurality of video streams from the plurality of end-users,
    to provide the plurality of video streams to the first video gateway computer system,
    to receive the video content from the first video gateway computer system, and
    to transmit the video content to at least one of the plurality of end-users in a format optimized to at least one device associated with the at least one of the plurality of end users,
    wherein the video content includes active video information and non-active video information, and
    wherein the at least one second video gateway Computer system is further operative:
    to implement, at least at some times, focusing features for the at least one device, including transmitting only the active video information for subsequent display on the at least one device,
    to implement, at least at some times, bandwidth reduction features for the at least one device, including one or more of limiting transmission of the non-active video information to the at least one device, and transmitting the non-active video information in a reduced resolution format for subsequent display on the at least one device, and to limit, at least at some times, a number of presentation windows on the at least one device, thereby facilitating display of one or both of the active video information and the non-active video information on the at least one device.

2. A method for managing video conferencing, the method comprising:

formatting, by a first video gateway computer system, presentation of video content of a plurality of video signals to a plurality of end-users, the video content representing at least one aspect of a video collaboration session involving the plurality of end-users;

grouping the plurality of end-users into a plurality of groups by a video conferencing computer system, the video conferencing computer system being communicably coupled to the first video gateway computer system;

generating at least one task for the plurality of groups by the video conferencing computer system;

coaching, by the video conferencing computer system, at least some of the plurality of groups through completion of the at least one task;

receiving the video content at a second video gateway computer system from the first video gateway computer system; and transmitting, by the second video gateway computer system, the video content to at least one of the plurality of end-users in a format optimized to at least one device associated with the at least one of the plurality of end-users, the video content including active video information and non-active video information;

implementing, at least at some times by the second video gateway computer system, focusing features for the at least one device, the implementing of the focusing features including transmitting only the active video information for subsequent display on the at least one device;

implementing, at least at some times by the second video gateway computer system, bandwidth reduction features for the at least one device, the implementing of the bandwidth reduction features including one or more of limiting transmission of the non-active video information to the at least one device, and transmitting the non-active video information in a reduced resolution format for subsequent display on the at least one device; and limiting, at least at some times by the second video gateway computer system, a number of presentation windows on the at least one device, thereby facilitating display of one or both of the active video information and the non-active video information on the at least one device.

3. The method of claim 2, further comprising receiving information associated with the at least one device of the plurality of end-users.

4. The method of claim 3, wherein the plurality of video signals include a plurality of video streams, and wherein the method further comprises:

adjusting a number of the plurality of video streams displayed to an end-user in response to the information associated with the at least one device of the plurality of end-users.

5. The method of claim 2, further comprising inserting, by the second video gateway computer system, additional content into the video content.

6. The method of claim 5, wherein the additional content comprises at least one advertisement.

7. The method of claim 2, wherein the end-users communicate through a plurality of network service providers.

8. The method of claim 7, where at least one of the plurality of network service providers operate the at least one second video gateway computer system.

9. The method of claim 8, wherein the at least one of the plurality of network service providers control tuning of the transmission of the video content to the at least one device of the plurality of end-users.

* * * * *